United States Patent [19]
Keijzer et al.

[11] 3,857,580
[45] Dec. 31, 1974

[54] VEHICLE LEVELING SYSTEM

[75] Inventors: Johan H. Keijzer; J. Hans Van Den Berg; Willy R. J. Pierle, all of Tienen; Louis Joseph Jossa, St. Truiden, all of Belgium

[73] Assignee: Monroe Belgium, N.V., St. Truiden, Belgium

[22] Filed: Dec. 20, 1973

[21] Appl. No.: 426,470

Related U.S. Application Data

[63] Continuation of Ser. No. 217,016, Jan. 11, 1972, abandoned.

[52] U.S. Cl. ............ 280/124 F, 280/6 R, 267/65 D
[51] Int. Cl. ........................................ B60g 17/06
[58] Field of Search ... 280/124 F, 6 R, 6 H, DIG. 1; 267/65 D

[56] References Cited
UNITED STATES PATENTS

| | | | |
|---|---|---|---|
| 3,510,143 | 5/1970 | Carpenter | 280/6 R |
| 3,603,611 | 7/1971 | Wenham | 280/124 |

Primary Examiner—David Schonberg
Assistant Examiner—John A. Carroll
Attorney, Agent, or Firm—Harness, Dickey & Pierce

[57] ABSTRACT

A leveling system for a vehicle having sprung and unsprung portions, the system including at least one air pressure operated leveling strut for varying the attitude between the sprung and unsprung vehicle portions, an electrically energized air compressor for supplying pressurized air to the strut, first circuit means including valve means for communicating pressurized air between the compressor and the strut, second circuit means for communicating electrical energy from a source thereof to the compressor, and means responsive to orientation of the sprung vehicle portion below some predetermined position for completing the second circuit means and thereby energizing the compressor, and responsive to orientation of the sprung vehicle portion above some predetermined position for opening the valve means and communicating the first circuit means with either the atmosphere or a pressure reservoir.

33 Claims, 2 Drawing Figures

PATENTED DEC 31 1974  3,857,580

3,857,580

VEHICLE LEVELING SYSTEM

This is a continuation of application Ser. No. 217,016, filed Jan. 11, 1972, and now abandoned.

BACKGROUND OF THE INVENTION

Due to the large amount of legislation which is being enacted to require automotive vehicles and the like to be provided with some type of vehicle leveling system, the need for such leveling systems is ever increasing. Air pressure operated struts have been found to be highly desirable for use in varying the attitude of the sprung portion of a vehicle relative to the unsprung portion thereof, but since pressurization of such struts at automotive service stations has been found to be impractical, it has been found necessary to provide the associated vehicle with some type of compressor or other source of pressurized air which works in combination with a leveling valve or switch. A number of such systems are presently known such as those which operate by the vacuum of the intake manifold of the vehicle engine; however, such systems have been found to be inappropriate for vehicles which employ relatively small internal combustion engines. While a number of designs for such small engine cars have been proposed, such as that shown in U.S. Pat. No. 3,603,611, these systems have been found to be impractical due to the fact that they require large pressure accumulator tanks and relatively complex solenoid valves which function to communicate pressurized air to and from the associated struts.

The present invention is directed toward a new and improved leveling system which overcomes the aforementioned objectionable characteristics of similar type systems heretofore known and used, and in particular, the present invention is directed toward a leveling system which obviates the need for accumulator tanks with maximum-minimum pressure switches and which also utilize solenoid type valves which are not only costly to manufacture but are expensive to operate and maintain.

It is accordingly a general object of the present invention to provide a new and improved vehicle leveling system.

It is a more particular object of the present invention to provide a new and improved vehicle leveling system which obviates the need for accumulator tanks and solenoid valves.

It is still a more particular object of the present invention to provide a new and improved vehicle leveling system which incorporates an electrically energized compressor and a combination control switch and valve assembly which is operable in response to changes in attitude between the sprung and unsprung portions of the associated vehicle to effect energization of the associated compressor and effect a venting of the air system to the atmosphere when the sprung portion of the vehicle is in a relatively elevated position with respect to a desired level attitude.

It is still another object of the present invention to provide a new and improved leveling system, as above described, which is of a relatively simple design, is economical to manufacture and easy to install.

Other objects and advantages of the present invention will become apparent from the following detailed description, taken in conjunction with the accompanying drawing.

DESCRIPTION OF THE PREFERRED EMBODIMENT

Figure 1:
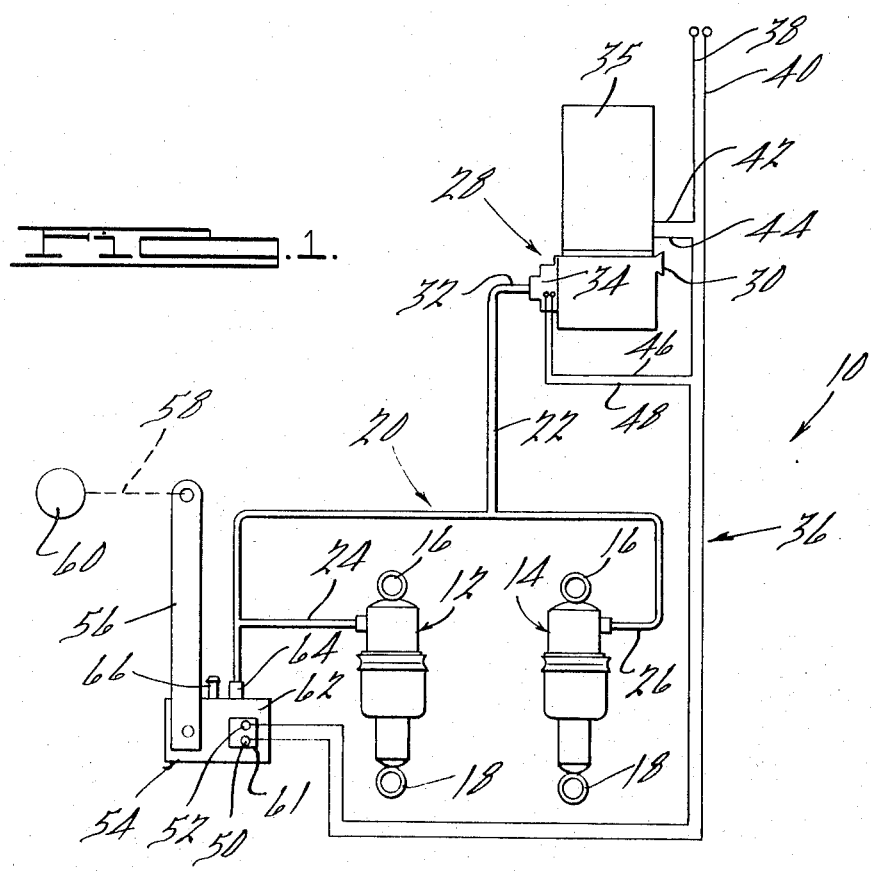
FIG. 1 is a schematic representation of a vehicle leveling system in accordance with one preferred embodiment of the present invention.

Referring now in detail to the drawing and in particular to FIG. 1 thereof, a leveling system 10, in accordance with one preferred embodiment of the present invention, is shown as comprising a pair of leveling struts 12 and 14 which are adapted to be longitudinally extendable and contractable for varying the attitude or orientation between the sprung and unsprung portions of an associated vehicle. The struts 12, 14 are provided with upper attachment means 16 adapted to be secured to the sprung portion of the associated vehicle and with lower attachment means 18 adapted to be secured to the unsprung portion thereof. Generally, in operation of the present invention, pressurized air is supplied to the struts 12, 14 to effect extension or expansion thereof, thereby causing the sprung portion of the vehicle to be elevated. At such time as the sprung portion of the vehicle is, for any reason, disposed above some predetermined level attitude, the pressurized air which was supplied to the struts 12, 14 is exhausted therefrom, whereby to permit collapsing or contraction thereof and hence lowering of the associated sprung vehicle portion.

The leveling system 10 of the present invention is provided with an actuating fluid circuit, generally designated by the numeral 20, which comprises a supply conduit 22 that is communicable with a pair of inlet conduits 24 and 26 communicable with the struts 12, 14 respectively. The supply conduit 22 is communicable at its inlet end with an electrically energized combination air compressor — air dryer unit, generally designated by the numeral 28, which includes a fresh air inlet 30 and an air outlet 32 that is communicable with the compressor unit 28 via a pressure sensitive electrical switch 34. The unit 28 comprises an electrically energized drive motor 35 which, when energized, causes pressurized air to be communicated via the conduits 22, 24 and 26 to the struts 12, 14.

The leveling system 10 also comprises an electrical control circuit, generally designated by the numeral 36, which includes a pair of conductors 38, 40 which are connected to any suitable source of electrical energy, such as the battery of the associated automotive vehicle. The control circuit 36 is connected to the electric drive motor 35 via conductors 42, 44. Similarly, the electrical control circuit 36 is communicable with the pressure sensitive switch 34 via conductors 46, 48. As shown in FIG. 1, the conductors 38, 40 are connected to terminals 50, 52 of a combination control switch and valve assembly, generally designated by the numeral 54. The assembly 54 comprises a control lever 56 which is connected via any suitable means, representatively designated by the numeral 58, to the unsprung portion of the associated vehicle, such as the axle 60 thereof. With this arrangement, at such time as there is a predetermined change in attitude between the sprung and unsprung vehicle portions, the control lever 56 will be pivoted or otherwise actuated, thus effecting actuation of the assembly 54. Such actuation of the lever 56 is intended to effect opening and closing of a control switch 61, thus completing the circuit between the conductors 38, 40. In addition, the assembly 54 comprises an air valve of any suitable construction and generally designated by the numeral 62. The valve 62 comprises an inlet 64 which is communicable with the conduit 22 of the actuating fluid circuit 20. The valve 62 also comprises an outlet 66 which is communicable with the atmosphere.

In operation, at such time as the sprung portion of the vehicle is heavily loaded or is otherwise disposed below a preselected level attitude, the control lever 56 will be actuated, thereby actuating the switch 61 to complete the electrical control circuit 36 to the compressor unit 28. When this occurs, the motor 35 will be energized, thereby supplying pressurized air to the leveling struts 12, 14 and hence effecting expansion thereof, resulting in the sprung portion of the vehicle being elevated to some preselected level attitude. At such time as the vehicle is unloaded or for some other reason has the sprung portion thereof disposed in an attitude above a desired level attitude, the control lever 56 will again be actuated in a manner so as to effect opening of the valve 62. When this occurs, the inlet 64 will be communicated with the outlet 66, thus venting the fluid circuit 20 with the atmosphere so that the struts 12, 14 may be collapsed under the weight of the sprung portion of the vehicle. At such time as the vehicle again reaches a level attitude, the control lever 56 will be actuated to effect closing of the valve 62 so that the sprung portion of the vehicle will be maintained in the aforesaid preselected level attitude. The aforementioned pressure sensitive switch 34 is provided as a safety precaution and intended to function in the manner well known in the art in preventing the drive motor 35 of the compressor unit 38 from operating indefinitely when the associated vehicle is overloaded.

Figure 2:
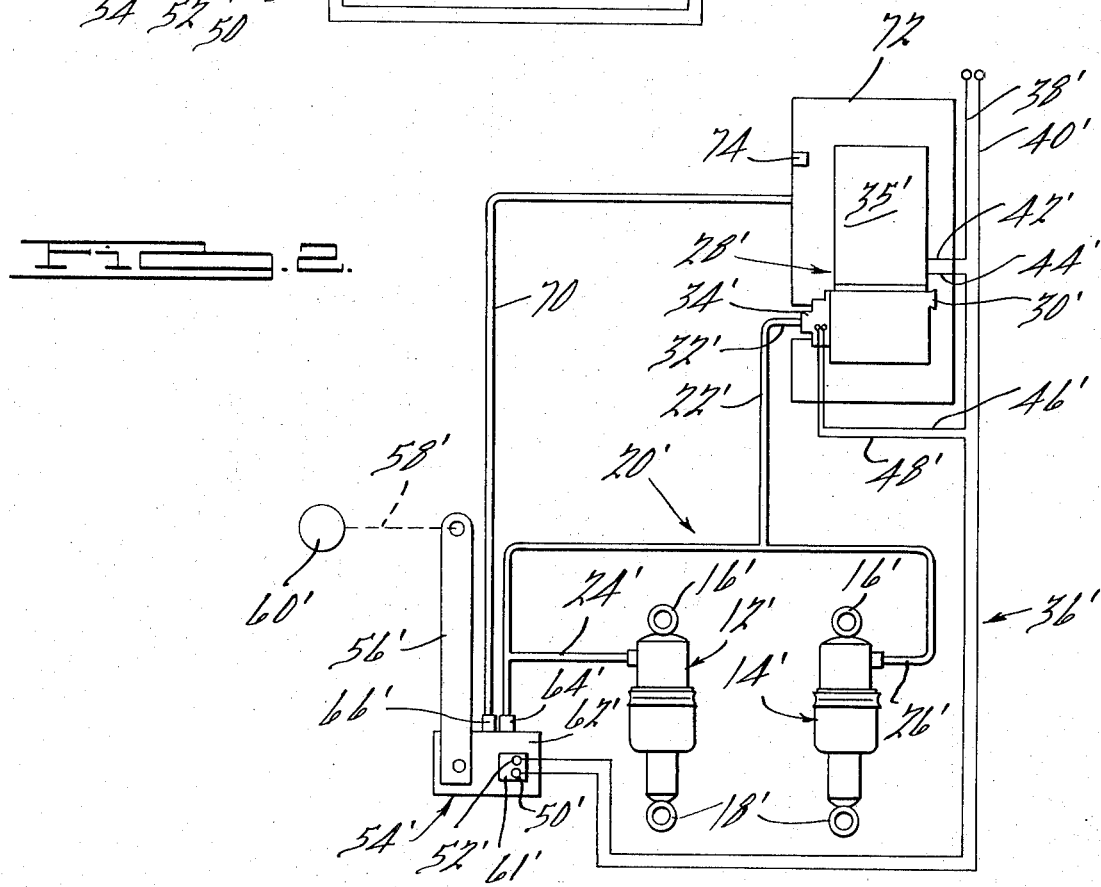
FIG. 2 is a schematic representation of a modified embodiment of the leveling system of the present invention.

FIG. 2 illustrates a slightly modified embodiment of the leveling system 10 of the present invention and all components thereof which are analagous to the components of the control system 10 are designated by like numerals with a prime suffix. The leveling system 10' shown in FIG. 2 is substantially the same as the leveling system 10, with the exception that the outlet 66' of the valve 62' is communicable via a conduit 70 with an air pressure reservoir, generally designated by the numeral 72. This arrangement is particularly adapted for closed leveling systems wherein it is desired to obviate the normal collection of moisture in the various component parts of the system. That is, the compressed air which is exhausted from the outlet 66' of the valve 62', instead of being vented to the atmosphere, is communicated back to the reservoir 72 where such air is recirculated upon the next operational cycle of the unit 28' back to the struts 12', 14'. It may be noted that a very light inlet valve 74 may be provided in the reservoir 72 to permit fresh outside air to enter the reservoir 72 during the initial operation of the unit 28', which valve 74 will only open to admit fresh outside air at such time as there is a preselected quantity of air lost due to leakage or the like.

It will be seen from the foregoing that the present invention provides novel leveling systems for automotive vehicles which obviate the need for any large and expensive accumulator tanks and/or expensive solenoid valves which have heretofore been required in similar type systems in the prior art. It may be noted that while only two of the struts 12, 14 are shown with each of the systems depicted in FIGS. 1 and 2, it will be appreciated that such struts may be provided in larger numbers, such as four for various applications. In addition, it may be noted that the struts 12, 14 may, or may not, be provided with integral shock absorbers, where desired, and that the struts 12, 14 need not necessarily comprise "helper" springs, since they could very well comprise the sole spring means for the vehicle.

While it will be apparent that the preferred embodiments illustrated herein are well calculated to fulfill the objects above stated, it will be appreciated that the present invention is susceptible to modification, variation and change without departing from the scope of the invention.

What is claimed is:

1. A leveling system for a vehicle having sprung and unsprung portions,
   at least one air pressure operated leveling strut for varying the attitude between the sprung and unsprung vehicle portions,
   an electrically energized source of pressurized gas for supplying pressurized gas to said strut,
   a pressurized gas circuit including a gas conduit directly connecting said source with said strut for directly communicating pressurized gas between said source and said strut,
   an electrical circuit for communicating electrical energy to said compressor from a source thereof, and
   a vehicle attitude sensing device responsive to variations in attitude between the sprung and unsprung portions of a vehicle,
   said device including a valve communicable with said gas circuit and an electrical switch for opening and closing said electrical circuit, and
   actuating means responsive to orientation of the sprung vehicle portion below some predetermined position for closing said valve and actuating said switch so as to energize said gas source and cause pressurized gas to be communicated from said gas source to said strut and thus expand said strut, and to orientation of said sprung vehicle portion above some predetermined position for opening said valve means and deactivating said switch, whereby a portion of said gas circuit is connected with a relatively lower pressure condition to permit said strut to collapse.

2. A leveling system as set forth in claim 1 which includes a pressurized reservoir, and wherein said last mentioned means is responsive to orientation of said sprung vehicle portion below some predetermined position for completing said second circuit means, and is responsive to orientation of said sprung vehicle portion above some predetermined position for opening said valve means and communicating said first circuit means with said reservoir.

3. The invention as set forth in claim 1 wherein said lower pressure condition consists of atmospheric pressure.

4. The invention as set forth in claim 1 wherein said pressurized gas comprises compressed air.

5. The invention as set forth in claim 1 which includes a second means for opening and closing an electrical circuit in response to a predetermined operating condition in the system.

6. The invention as set forth in claim 5 wherein said second means comprises a second switch means for opening and closing said electrical circuit in response to the internal pressure of said system.

7. The invention as set forth in claim 1 wherein said vehicle attitude sensing device is mounted on one of said vehicle portions, and which includes an operating lever connected to one of said vehicle portions and movable in response to changes in attitude between said vehicle portions for opening and closing said electrical circuit means and operating said valve means.

8. The invention as set forth in claim 1 wherein said lower pressure condition consists of atmospheric pressure, wherein said pressurized gas comprises compressed air, and which includes a pressure control means responsive to the gas pressure in said strut for opening and closing said electrical circuit to said compressor.

9. The invention as set forth in claim 8 wherein said pressure control means comprises a second switch means responsive to the internal pressure of said strut, wherein said vehicle attitude sensing device is mounted on one of said vehicle portions, and which includes an operating lever connected to the other of said vehicle portions and movable in response to changes in attitude between said vehicle portions for opening and closing said electrical circuit means and operating said valve means.

10. A vehicle leveling system including a pair of leveling struts interposed between the sprung and unsprung portions of a vehicle,
said system also including an electrically energized compressor,
electrical circuit means for communicating electrical energy from a source thereof to said compressor,
conduit means defining a first gas flow path between said compressor and said struts and a second gas flow path between said struts and a lower pressure condition,
electrical switch means for opening and closing said circuit means,
pressure control means for effecting deenergization of said compressor in response to the internal gas pressure of said struts,
flow control means for selectively connecting said first and second flow paths, and
a vehicle attitude sensing device responsive to orientation of the sprung portion of the vehicle below some predetermined position for actuating said switch means to close said circuit and thereby energize said compressor and simultaneously actuate flow control means to block communication between said first gas flow path and said second flow path,
said sensing device also being responsive to orientation of the sprung portion of the vehicle above some predetermined position to actuate said switch means to open said circuit and simultaneously actuate said flow control means to connect said first and second flow paths, whereby said compressor will be deenergized and said struts will be communicated with said lower pressure condition.

11. The invention as set forth in claim 10 wherein said lower pressure condition consists of atmospheric pressure.

12. The invention as set forth in claim 10 wherein said pressurized gas comprises compressed air.

13. The invention as set forth in claim 10 wherein said pressure control means comprises means for opening and closing an electrical circuit to said compressor.

14. The invention as set forth in claim 13 wherein said second means comprises a second switch means for opening and closing said electrical circuit in response to the internal pressure of said system.

15. The invention as set forth in claim 10 wherein said vehicle attitude sensing device is mounted on one of said vehicle portions, and which includes an operating lever connected to one of said vehicle portions and movable in response to changes in attitude between said vehicle portions for opening and closing said electrical circuit means and operating said valve means.

16. The invention as set forth in claim 10 wherein said lower pressure condition consists of atmospheric pressure, wherein said pressurized gas comprises compressed air, and which includes a second means for opening and closing said electrical circuit in response to a predetermined operating condition in the system.

17. The invention as set forth in claim 16 wherein said second means for opening and closing said electrical circuit comprises a second switch means responsive to the internal pressure of said system, wherein said vehicle attitude sensing device is mounted on one of said vehicle portions, and which includes an operating lever connected to the other of said vehicle portions and movable in response to changes in attitude between said vehicle portions for opening and closing said electrical circuit means and operating said valve means.

18. A vehicle leveling system including a pair of leveling struts interposed between the sprung and unsprung portions of a vehicle,
said system also including an electrically energized compressor,
electrical circuit means for communicating electrical energy from a source thereof to said compressor,
conduit means defining a first gas flow path between said compressor and said struts and a second gas flow path between said struts and a lower pressure condition,
said conduit means defining said first gas flow path directly connecting said compressor with said struts,
first electrical switch means for opening and closing said circuit means,
second electrical switch means for opening and closing said circuit means in response to preselected operating conditions of said system,
flow control means for selectively connecting said first and second flow paths, and
a vehicle attitude sensing device responsive to orientation of the sprung portion of the vehicle below some predetermined position for actuating said first switch means to close said circuit and thereby energize said compressor and simultaneously actuate said flow control means to block communication between said first gas flow path and said second flow path,
said sensing device also being responsive to orientation of the sprung portion of the vehicle above some predetermined position for actuating said switch means to open said circuit and simultaneously actuate said flow control means to connect said first and second flow paths, whereby said compressor will be deenergized and said struts will be communicated with said lower pressure condition.

19. The invention as set forth in claim 18 wherein said lower pressure condition consists of atmospheric pressure.

20. The invention as set forth in claim 18 wherein said pressurized gas comprises compressed air.

21. The invention as set forth in claim 18 wherein said second means comprises a second switch means for opening and closing said electrical circuit in response to the internal pressure of said system.

22. The invention as set forth in claim 18 wherein said vehicle attitude sensing device is mounted on one of said vehicle portions, and which includes an operating lever connected to one of said vehicle portions and movable in response to changes in attitude between said vehicle portions for opening and closing said electrical circuit means and operating said valve means.

23. The invention as set forth in claim 18 wherein said lower pressure condition consists of atmospheric pressure, wherein said pressurized gas comprises compressed air, and which includes a pressure control means for opening and closing said electrical circuit in response to a predetermined operating condition in the system.

24. The invention as set forth in claim 23 wherein said second means for opening and closing said electrical circuit comprises a second switch means responsive to the internal gas pressure of said struts, wherein said vehicle attitude sensing device is mounted on one of said vehicle portions, and which includes an operating lever connected to the other of said vehicle portions and movable in response to changes in attitude between said vehicle portions for opening and closing said electrical circuit means and operating said valve means.

25. A vehicle leveling system including a pair of leveling struts interposed between the sprung and unsprung portions of a vehicle,
said system also including an electrically energized compressor adapted to compress ambient air,
electrical circuit means for communicating electrical energy from a source thereof to said compressor,
conduit means defining a first compressed air flow path directly between said compressor and said struts and a second compressed air flow path between said struts and the atmosphere,
first electrical switch means for opening and closing said circuit means,
a second electrical switch comprising a pressure control means for opening and closing said circuit means directly in response to the compressed air pressure directly in said struts,
flow control means for selectively connecting said first and second flow paths, and
a vehicle attitude sensing device responsive to orientation of the sprung portion of the vehicle below some predetermined position for actuating said first switch means to close said circuit and thereby energize said compressor and simultaneously activate said flow control means to block communication between said first gas path and said second flow path,
said sensing device also being responsive to orientation of the sprung portion of the vehicle above some predetermined position for actuating said switch means to open said circuit and simultaneously actuate said flow control means to connect said first and second flow paths, whereby said compressor will be deenergized and said struts will be communicated with the atmosphere.

26. The invention as set forth in claim 25 wherein said vehicle attitude sensing device is mounted on one of said vehicle portions, and which includes an operating lever connected to one of said vehicle portions and movable in response to changes in attitude between said vehicle portions for opening and closing said electrical circuit means and operating said valve means.

27. The invention as set forth in claim 26 wherein said operating lever is operatively connected to said upsprung portion of the vehicle.

28. A vehicle leveling system including a pair of leveling struts interposed between the sprung and unsprung portions of a vehicle,
said system also including an electrically energized compressor,
electrical circuit means for communicating electrical energy from a source thereof to said compressor,
conduit means defining a first gas flow path between said compressor and said struts and a second gas flow path between said struts and a lower pressure condition,
said conduit means defining said first gas flow path directly connecting said compressor with said struts,
electrical switch means for opening and closing said circuit means,
valve means for selectively connecting said first and second flow paths, and
pressure control means for selectively deenergizing said compressor in response to the gas pressure in said struts,
a vehicle attitude sensing device having said first electrical switch means and said valve means therein, said device being mounted on one of the vehicle portions and including an operating lever connected to the other of the vehicle portions and responsive to orientation of the sprung portion of the vehicle below some predetermined position for actuating said switch means to close said circuit and thereby energize said compressor and simultaneously actuate said valve means to block communication between said first gas flow path and said second flow path,
said operating lever also being responsive to orientation of the sprung portion of the vehicle above some predetermined position for actuating said switch means to open said circuit and simultaneously actuate said valve means to connect said first and second flow paths, whereby said compressor will be deenergized and said struts will be communicated with said lower pressure condition.

29. The invention as set forth in claim 28 wherein said lower pressure condition consists of atmospheric pressure.

30. The invention as set forth in claim 28 wherein said pressurized gas comprises compressed air.

31. The invention as set forth in claim 28 which includes a second means for opening and closing an electrical circuit in response to a predetermined operating condition in the system.

32. The invention as set forth in claim 28 wherein said pressure control means comprises a second switch means for opening and closing an electrical circuit in response to the internal pressure of said struts.

33. The invention as set forth in claim 28 wherein said operating lever is operatively connected to said unsprung portion of the vehicle.

* * * * *